Aug. 23, 1932.   C. L. GROVE   1,873,577
ARTIFICIAL BAIT
Filed March 10, 1932

Inventor
Chester L. Grove

By Robert H. Watson
Attorney

Patented Aug. 23, 1932

1,873,577

UNITED STATES PATENT OFFICE

CHESTER L. GROVE, OF FREDERICK, MARYLAND

ARTIFICIAL BAIT

Application filed March 10, 1932. Serial No. 598,042.

This invention relates to artificial bait, and particularly to a novel form of spoon which rotates rapidly in the water with a very slight pull on the fishing line. The spoon of my invention comprises an oblong sheet metal plate, concavo-convex in transverse section and having wings projecting from its sides in the general direction of the curvature of the plate. The plate tapers from the wings towards its ends, and its upper end is loosely connected to an eye or yoke which is rotatable about a supporting wire above a sphere which is also rotatably mounted on the wire. This sphere forms a circular bearing against which the convex side of the spoon rests. When the bait is thrown in the water, a slight pull on the fishing line causes the spoon to rotate rapidly, in one direction or the other, the direction of rotation depending upon the position of the spoon when it enters the water or its position at the time when the line is pulled.

In the accompanying drawing.

Figure 1:
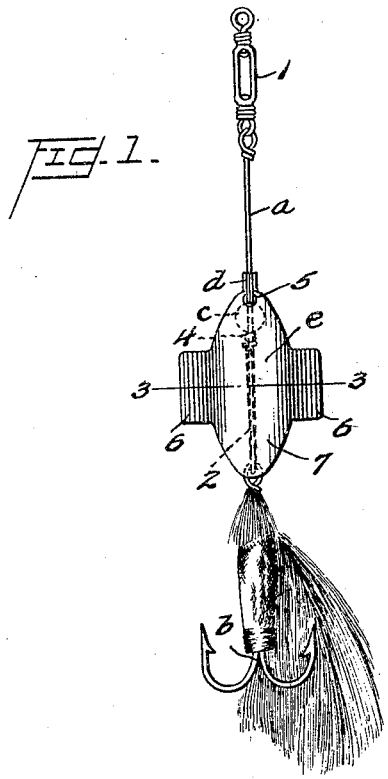
Fig. 1 illustrates an artificial bait, the spoon of my invention being shown in side elevation.
Figure 2:
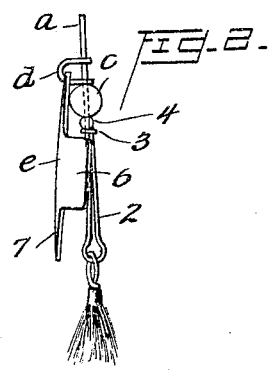
Fig. 2 shows the bait with the spoon in edge view.
Figure 3:
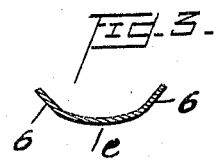
Fig. 3 is a transverse section through the spoon on the line 3—3 of Fig. 1.

Referring to the drawing, $a$ indicates a straight wire, connected at its upper end to a swivel 1 to which the fishing line attaches, and having a loop 2 at its lower end to which the hooks $b$ are connected. The end of one arm of the loop is twisted about the wire as indicated at 3, forming a rest or stop for a small perforated metal sphere 4 through which the wire $a$ extends, this sphere forming a bearing for a larger metal sphere $c$ which has a diametrical opening through which the wire $a$ extends. This sphere $c$ is made as perfectly as possible and turns freely on the wire. Above the sphere $c$, and resting upon it, is a U-shaped loop $d$, the ends of which are swiveled on the wire. This loop projects at right angles to the wire and supports the spoon $e$ of my invention. The spoon consists of an oblong metal plate having a perforation 5 at its upper end through which the loop $d$ extends. The plate is concavo-convex in transverse section, as shown in Fig. 3, and it has wings 6 at its opposite lateral edges extending in the general direction of the transverse curvature of the plate, although bent slightly inward therefrom, as shown in the drawing. From top to bottom, the plate is also slightly concavo-convex, and near its upper end, the concave side of the plate rests against the sphere $c$ which holds the plate so that it inclines downwardly and outwardly from the axis of the wire $a$. The side edges of the part 7 of the plate, below the wings, converge downwardly to the lower end of the plate, and the side edges of the plate, above the wings, converge upwardly to the upper end of the plate.

In operation, when the bait is cast into the water, the spoon starts to rotate immediately with the slightest pull upon the fishing line or with the flow of water past the bait. The sphere $c$ forms a bearing against which the spoon rests, and with which it revolves. The direction of rotation of the spoon depends upon the way it happens to enter the water or the position which it is in when the line is pulled; but when it starts in one direction, it will continue in that direction of rotation with a constant pull on the line or a steady flow of water past the bait. The spoon does not drag heavily in the water and a light pull on the line causes it to rotate rapidly. I attribute this action to the wings, and also, in some degree, to the tapering of the ends of the spoon, which offer little resistance to rotation or to the progress of the spoon through the water.

What I claim is:

1. In an artificial bait, a supporting wire, a circular bearing revolubly mounted on the wire, a loop swiveled on the wire above the bearing and a spoon comprising an oblong sheet metal plate, concavo-convex in transverse section, having its upper end loosely connected to said loop and its concave side adapted, when the bait is pulled through the water, to rest against said bearing, said spoon having wings projecting laterally from its central portion in the general direction of the transverse curvature of the plate.

2. In an artificial bait, a supporting wire, a circular bearing revolubly mounted on the wire, a loop swiveled on the wire above the bearing and a spoon comprising an oblong sheet metal plate, concavo-convex in transverse section, having its upper end loosely connected to said loop and its concave side adapted, when the bait is pulled through the water, to rest against said bearing, said spoon having wings projecting laterally from its central portion in the general direction of the transverse curvature of the plate, and the body of the spoon tapering from the wings toward its ends.

In testimony whereof I affix my signature.

CHESTER L. GROVE.